000
United States Patent Office 3,646,094
Patented Feb. 29, 1972

3,646,094
ALPHA CYANOBENZYL XANTHATES HAVING PESTICIDAL PROPERTIES
David Hugh Brooks, John Michael Cox, and Ian Trevor Kay, Bracknell, England, assignors to Imperial Chemical Industries Limited, London, England
No Drawing. Filed Feb. 19, 1969, Ser. No. 800,707
Claims priority, application Great Britain, Mar. 7, 1968, 11,185/68
Int. Cl. C07c 154/02
U.S. Cl. 260—455 B
3 Claims

ABSTRACT OF THE DISCLOSURE

Compounds having pesticidal properties and characterized by the formula:

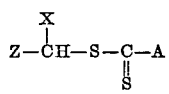

wherein Z represents a substituted or unsubstituted, aromatic group;
X represents an electron-withdrawing group; and A represents a group OR, SR or $NR^1R^2$ where R, $R^1$ and $R^2$ are hydrocarbon groups and where $R^1$ additionally can be hydrogen, or $R^1$ and $R^2$ together with the adjacent N atom form a heterocyclic ring.

---

This invention relates to new organic compounds, to methods for making them and to compositions containing them.

The invention provides compounds of the general formula:

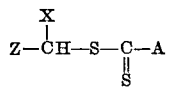

wherein Z represents a substituted or unsubstituted, aromatic group;
X represents an electron-withdrawing group; and A represents a group OR, SR or $NR^1R^2$ where R, $R^1$ and $R^2$ are hydrocarbon groups and where $R^1$ additionally can be hydrogen, or $R^1$ and $R^2$ together with the adjacent N atom form a heterocyclic ring.

The latter ring may contain one or more additional hetero atoms.

Preferred compounds are those in which Z is a substituted or unsubstituted phenyl radical and when substituted suitable substituents may be one or more halogen atoms or aliphatic, nitro, alkoxy or carbalkoxy groups. The X group is conveniently a cyano or nitro group or $COOR^4$ or $COR^4$ group wherein $R^4$ is a hydrocarbon.

More particularly the invention provides compounds having the formula:

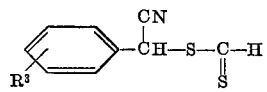

wherein $R^3$ represents one or more hydrogen or halogen atoms or nitro, carbalkoxy or alkoxy groups and A is either a group OR or SR wherein R is an alkyl group containing from 1 to 12 carbon atoms, or a group $NR^1R^2$ wherein $R^1$ and $R^2$ are either alkyl groups containing from 1 to 12 carbon atoms, or together with the N-atom form a heterocyclic ring. When $R^3$ is halogen it is preferably at least one chlorine atom and may represent up to five chlorine atoms. $NR^1R^2$ preferably represents a dialkylamino, pyrrolidino, piperidino, morpholino or piperazino group.

Specific compounds according to the invention are listed below in Table 1. These compounds conform to the general formula:

and the various substituent groups Z, X and A are set out in columns under corresponding headings.

TABLE 1

| Compound No. | Z | X | A | Physical characteristic, M.P., ° C. |
|---|---|---|---|---|
| 1 | $C_6H_5$ | CN | $(CH_3)_2N$ | M.P. 67–68° C. |
| 2 | $pCl.C_6H_4$ | CN | $(CH_3)_2N$ | M.P. 108° C. |
| 3 | $p.CH_3OC_6H_4$ | CN | $(CH_3)_2N$ | M.P. 95–96° C. |
| 4 | $C_6H_5$ | CN |  | M.P. 83–84° C. |
| 5 | $C_6H_5$ | CN |  | M.P. 94–95° C. |
| 6 | $C_6H_5$ | CN | Same as above_0 | M.P. 88–89° C. |
| 7 | $C_6H_5$ | $COOC_2H_5$ | $(CH_3)_2N$ | M.P. 77–78° C. |
| 8 | $C_6H_5$ | CN | 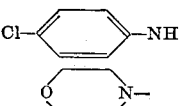 | M.P. 208–209° C. |
| 9 | $pCl.C_6H_4$ | CN | 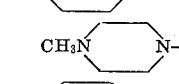 | M.P. 108–109° C. |
| 10 | $pCl.C_6H_4$ | CN | 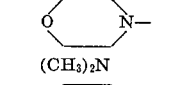 | M.P. 105° C. |
| 11 | $pCH_3OC_6H_4$ | CN | 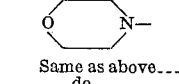 | M.P. 115–116° C. |
| 12 | $mCl.C_6H_4$ | CN | $(CH_3)_2N$ | M.P. 52–53° C. |
| 13 | $mCl.C_6H_4$ | CN |  | M.P. 83–84° C. |
| 14 | $op(Cl)_2C_6H_3$ | CN | Same as above | M.P. 145–146° C. |
| 15 | $m.NO_2.C_6H_4$ | CN | do | M.P. 124–125° C. |
| 16 | $m.COOC_2H_5\!-\!C_6H_4$ | CN | do | Oil. |

TABLE I—Continued

| Compound No. | Z | X | A | Physical characteristic, M.P., °C. |
|---|---|---|---|---|
| 17 | M.NO$_2$.C$_6$H$_4$ | CN | (CH$_3$)$_2$N— | M.P. 120–121° C. |
| 18 | o.p. (Cl)$_2$C$_6$H$_3$ | CN | (CH$_3$)$_2$N— | M.P. 123–124° C. |
| 19 | p. CH$_3$.C$_6$H$_4$ | CN | O⟨ ⟩N— | M.P. 103–104° C. |
| 20 | p. CH$_3$. C$_6$H$_4$ | CN | (CH$_3$)$_2$N— | M.P. 85–86° C. |
| 21 | m. CH$_3$.C$_6$H$_4$ | CN | O⟨ ⟩N— | M.P. 115° C. |
| 22 | p. Cl.C$_6$H$_4$ | CN | .OC$_2$H$_5$ | $n_D^{24}$ 1.6068. |
| 23 | p. Cl.C$_6$H$_4$ | CN | .OCH(CH$_3$)$_2$ | $n_D^{25}$ 1.5898. |
| 24 | p Cl.C$_6$H$_4$ | CN | .OCH$_3$ | $n_D^{22}$ 1.6115. |
| 25 | p. Cl.C$_6$H$_4$ | CN | .O.CH(CH$_3$)(CH$_2$)$_5$CH$_3$ | $n_D^{21}$ 1.5640. |
| 26 | p. Cl.C$_6$H$_4$ | CN | .O(CH$_2$)$_{11}$CH$_3$ | $n_D^{21}$ 1.5430. |
| 27 | p. COOC$_2$H$_5$ C$_6$H$_4$. | CN | .OC$_2$H$_5$ | Oil (see Example 7). |
| 28 | p. NO$_2$.C$_6$H$_4$ | CN | .OC$_2$H$_5$ | Oil (see Example 7). |
| 29 | o. Cl.C$_6$H$_4$ | CN | .OC$_2$H$_5$ | $n_D^{27}$ 1.6006. |
| 30 | o.p. (Cl)$_2$.C$_6$H$_3$ | CN | .OC$_2$H$_5$ | M.P. 87–88° C. |
| 31 | p.CH$_3$O.C$_6$H$_4$ | CN | .OC$_2$H$_5$ | $n_D^{26}$ 1.5882. |
| 32 | C$_6$H$_5$ | COCH$_3$ | .OC$_2$H$_5$ | Oil (see Example 7). |
| 33 | C$_6$H$_5$ | NO$_2$ | .OC$_2$H$_5$ | $n_D^{29}$ 1.5979. |
| 34 | C$_6$H$_5$ | COOC$_2$H$_5$ | .OC$_2$H$_5$ | $n_D^{15}$ 1.5642. |
| 35 | p.Cl.C$_6$H$_4$ | CN | .SC$_2$H$_5$ | See Example 5. |
| 36 | C$_6$H$_5$ | CN | .OC$_2$H$_5$ | $n_D^{22}$ 1.5995. |
| 37 | m.ClC$_6$H$_4$ | CN | .OC$_2$H$_5$ | $n_D^{22}$ 1.6032. |
| 38 | p.Cl.C$_6$H$_4$ | CN | —OC$_5$H$_{11-n}$ | $n_D^{24}$ 1.5788. |
| 39 | m.COOC$_2$H$_5$.C$_6$H$_4$ | CN | —OC$_2$H$_5$ | $n_D^{23}$ 1.5811. |
| 40 | C$_6$Cl$_5$ | CN | .OC$_2$H$_5$ | $n_D^{22}$ 1.6370. |

Particularly useful compounds are those numbered 22 and 30 in Table 1 above, that is the compound having the formula:

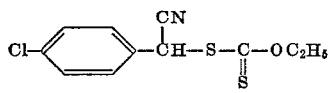

and the compound having the formula:

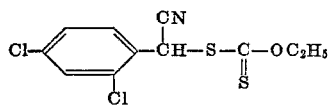

The invention compounds may be prepared by any convenient method. A particularly suitable method comprises bringing into reaction the appropriate organo-cyanide, and the appropriate di-, or tri-thiocarbonate, or dithiocarbamate, salt, for example an alkali metal salt.

More particularly, therefore, compounds of formula:

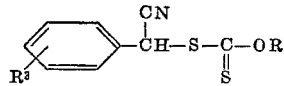

may conveniently be made by reacting an α-halobenzyl cyanide with a metal alkylxanthate salt, e.g. an alkali metal alkylxanthate salt, whilst compounds of formula:

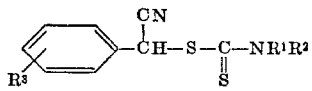

may conveniently be made by reacting an α-halobenzyl cyanide with a suitably substituted dithiocarbamate salt.

The compounds of the invention are fungicidal and exhibit activity, in particular, against both seed borne disease, for example diseases such as *Pythium ultimum*, *Fusarium culmorum* and *Rhizoctonia solani;* and foliar borne disease, for example,

*Sphaerotheca fuliginea* (cucumber powdery mildew)
*Podosphaera leucotricha* (apple powdery mildew)
*Plasmopara viticola* (vine downy mildew)
*Phytophthora infestans* (tomato late blight)
*Puccinia recondita* (wheat rust)
*Piricularia oryzae* (rice blast)

A particularly useful feature of the activity of some of the invention compounds is their ability to act individually as systemic pesticides, that is to say, their ability to move in a plant to combat an infection or infestation thereon remote from a site of initial application of a compound. Thus a compound of the invention, or a composition containing the same, may be applied to the soil surrounding the roots of a plant and taken up by the plant through its roots to combat pests on the plant.

Some of the invention compounds also exhibit insecticidal and nematocidal activity for example against *Aedes aegypti* and *Meloidogyne incognita*, and some of them display a chemosterilant effect upon red spider mites (*Tetranychus telarius*).

The compounds may be used as such to combat plant pathogens but are more conveniently applied when admixed with a diluent.

In a further aspect, therefore the invention includes pesticidal compositions comprising as an active ingredient a compound as hereinbefore defined and a diluent.

The compositions of the invention can be used to combat plant pathogens in a number of ways. Thus they can be applied to the foliage of an infected plant, to seed or to the soil in which plants are growing or to be planted.

In a further aspect, therefore, the invention includes a method for the combating of undesired pathogens, pests and fungal infections in growing plants which comprises applying to a plant, to the locus of a plant, or to the seeds of a plant a compound as hereinbefore defined or a composition containing it.

In yet a further aspect the invention includes a method for treating agricultural soil comprising applying to the soil a compound as hereinbefore defined or a composition containing it.

The compositions may be used for agricultural and horticultural purposes and the type of composition used in any instance will depend upon the particular purpose for which it is to be used.

The compositions may be in the form of dusting powders or granules wherein the active ingredient is mixed with a solid diluent or carrier. Suitable solid diluents or carriers may be, for example kaolin, bentonite, kieselguhr, dolomite, calcium carbonate, talc, powdered magesia, fuller's earth, gypsum, Hewitt's earth, diatomaceous earth and China clay. Compositions for dressing seed, for example, may comprise an agent assisting the adhesion of the composition to the seed, for example a mineral oil.

The composition may also be in the form of dispersible powders or grains comprising, in addition to the active ingredient, a wetting agent to facilitate the dispersion of the powders or grains in liquids. Such powders or grains may include fillers, suspending agents and the like.

The compositions may also be in the form of liquid preparations to be used as dips or sprays which are generally solutions, aqueous dispersions or emulsions containing the active ingredient in the presence of one or more wetting agents, dispersing agents, emulsifying agents or suspending agents.

Wetting agents, dispersing agents and emulsifying agents may be of the cationic, anionic, or non-ionic type. Suitable agents of the cationic type include, for example, quaternary ammonium compounds, for example cetyltrimethylammonium bromide. Suitable agents of the anionic type include, for example soaps, salts of aliphatic monoesters of sulphuric acid, for example sodium lauryl sulphate, salts of sulphonated aromatic compounds, for example sodium dodecylbenzenesulphonate, sodium calcium or ammonium lignosulphonate, butyl-naphthalene sulphonate, and a mixture of the sodium salts of diisopropyl- and triisopropyl-naphthalene sulphonic acids. Suitable agents of the non-ionic type include, for example, the condensation products of ethylene oxide with a fatty alcohols such as oleyl alcohol or cetyl alcohol, or with alkyl phenols such as octylphenol, nonylphenol and octylcresol. Other non-ionic agents are the partial esters derived from long chain fatty acids and hexitol anhydrides, the condensation products of the said partial esters with ethylene oxide, and the lecithins. Suitable suspending agents are, for example, hydrophilic colloids, for example polyvinylpyrrolidone and sodium carboxymethylcellulose, and the vegetable gums, for example gum acacia and gum tragacanth.

The aqueous solutions, dispersions or emulsions may be prepared by dissolving the active ingredient or ingredients in an organic solvent which may contain one or more wetting, dispersing or emulsifying agents and then adding the mixture so obtained to water which may likewise contain one or more wetting, dispersing or emulsifying agents. Suitable organic solvents are ethylene dichloride, isopropyl alcohol, propylene glycol, diacetone alcohol, toluene, kerosene, methylnaphthalene, xylenes and trichloroethylene.

The compounds of the invention may also be formulated into compositions comprising capsules or microcapsules containing either the active ingredient itself, or a composition containing the active ingredient, and prepared by the known encapsulation or microencapsulation techniques.

The compositions to be used as sprays may also be in the form of aerosols wherein the formulation is held in a container under pressure in the presence of a propellant such as fluorotrichloromethane or dichlorodifluoromethane.

By the inclusion of suitable additives, for example for improving the distribution, adhesive power and resistance to rain on treated surfaces, the different compositions can be better adapted for the various uses for which they are intended.

The compounds may also be conveniently formulated by admixing them with fertilizers. A preferred composition of this type comprises granules of fertiliser material incorporated, for example coated with, an invention compound. The fertiliser material may, for example, comprise nitrogen or phosphate-containing substances.

The compositions which are to be used in the form of aqueous dispersions or emulsions are generally supplied in the form of a concentrate containing a high proportion of the active ingredient or ingredients, the said concentrate to be diluted with water before use. These concentrates are often required to withstand storage for prolonged periods and after such storage, to be capable of dilution with water in order to form aqueous preparations which remain homogeneous for a sufficient time to enable them to be applied by conventional spray equipment. The concentrates may conveniently contain from 10–85% by weight of the active ingredient or ingredients and and generally from 25–60% by weight of the active ingredient or ingredients. When diluted to form aqueous preparations, such preparations may contain varying amounts of the active ingredient or ingredients depending upon the purpose for which they are to be used, but an aqueous preparation containing between 0.001% and 1.0% by weight of active ingredient or ingredients may be used.

It is to be understood that the compositions of this invention may comprise, in addition to an invention compound, one or more other compounds having biological activity.

The invention is illustrated but not limited by the following examples.

EXAMPLE 1

This example illustrates the preparation of S-p-chloro-α-cyanobenzyl-O-ethylxanthate (Compound No. 22 of Table 1) having the structural formula:

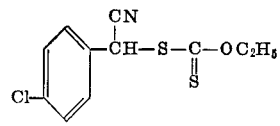

A mixture of ethyl potassium xanthate (4.6 g.) p-chloro-α-bromobenzyl cyanide (4.6 g.) and dry benzene (60 ml.) was refluxed for one hour. Water (150 ml.) was added and the benzene layer separated, washed with water, dried and evaporated. The residue was heated at 100° at 0.5 mm. for fifteen minutes leaving S-p-chloro-α-cyanobenzyl-O-ethylxanthate (4.9 g.) as a pale yellow oil of analytical purity. $n_D^{24}$ 1.6068. (Found: N, 5.43; S, 23.4; $C_{11}H_{10}ClNOS_2$ requires: N, 5.16; S, 23.7%). The infra-red spectrum shows very strong bands at 1050 cm.$^{-1}$ and 1250 cm.$^{-1}$. N.M.R. spectrum: (CDCl$_3$) τ (tau) values: 2.56 (4H, singlet, aromatic); 4.32 (1H, singlet, methine); 5.26 (2H, quartet, J=7 cps methylene); 8.55 (3H, triplet, J=7 cps methyl).

EXAMPLE 2

This example illustrates the preparation of S-p-chloro-α-cyanobenzyl-O-isopropylxanthate (Compound No. 23 of Table 1) having the structural formula:

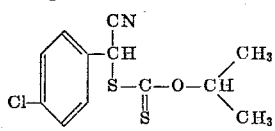

A mixture of isopropyl sodium xanthate (4.7 g.), p-chloro-α-bromobenzyl cyanide (4.6 g.) and dry benzene (60 ml.) was refluxed for two hours. Water (100 ml.) was added, and the benzene layer separated, washed with water, dried and evaporated. The residue was heated at 100° at 0.1 mm. for one hour leaving S-p-chloro-α-cyanobenzyl-O-isopropyl xanthate (5.4 g.) as a pale yellow oil $n_D^{25}$ 1.5898.

EXAMPLE 3

This example illustrates the preparation of S-p-chloro-α-cyanobenzyl-O-methylxnthate (Compound No. 24 of Table 1) having the structural formula:

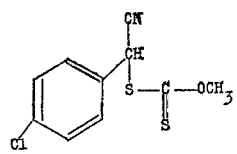

A mixture of methyl potassium xanthate (9.0 g.), p-chloro-α-bromobenzyl cyanide (9.2 g.) and dry benzene (120 ml.) was refluxed, with stirring, for one and a half hours. Water (200 ml.) was added and the benzene layer separated. The extracts were washed with water, dried and evaporated, finally at 0.1 mm. for two hours to give S-p-chloro-α-cyanobenzyl-O-methylxanthate (9.9 g.) as a pale yellow oil. $n_D^{22}$ 1.6115.

EXAMPLE 4

This example illustrates the preparation of S-2,4-dichloro - α - cyanobenzyl - O - ethyl - dithiocarbonate (Compound No. 30 of Table 1) having the structural formula:

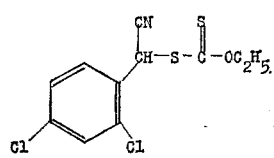

A mixture of 2,4-dichloro-α-cyanobenzyl bromide (5.3 g.) potassium ethyl xanthate (4.8 g.) and dry benzene (50 ml.) was refluxed for two hours, cooled, extracted with water, dried and evaporated to give a white solid. The compound was obtained in yield 6.1 g. 100% (M.P. 85–88°). Recrystallization from petroleum (B.P. 60–80°) raised the M.P. to 87–88°. Infrarel spectrum: $\nu$ max. (nujol) 1050 cm.$^{-1}$.

*Analysis.*—$C_{11}H_9Cl_2NOS_2$ requires (percent): C, 43.13; H, 2.96 N, 4.57; S, 20.94. Found (percent): C, 43.1; H, 3.0; N, 4.2; S, 22.0.

EXAMPLE 5

This example illustrates the preparation of p-chloro-α-cyanobenzyl ethyl trithiocarbonate (compound No. 35 of Table 1) having the structural formula:

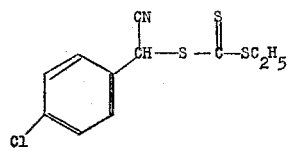

A mixture of p-chloro-α-cyanobenzyl bromide (4.6 g.) potassium ethyl trithiocarbonate (5.4 g.) and N,N-dimethyl formamide (40 ml.) was stirred at room temperature for sixteen hours. Water was added and the solution extracted with ether. The extracts were washed, dried and evaporated to give a reddish-brown liquid (3.2 g.) $\nu$ max. 1100 cm.$^{-1}$.

$C_{11}H_{10}ClNS_3$ requires N, 4.87; S, 33.42. Found: N, 5.26; S, 27.2%.

EXAMPLE 6

This example illustrates the preparation of S-2,3,4,5,6-pentachloro - α - cyanobenzyl - O - ethyl dithiocarbonate (Compound No. 40 of Table 1) having the structural formula:

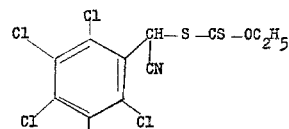

A mixture of 2,3,4,5,6-pentachloromandelonitrile (0.4 g.) and thionyl chloride (10 ml.) was refluxed for 72 hours. Then evaporated to dryness in vacuo. The residue was refluxed with potassium ethyl xanthate (0.3 g.) and dry benzene (10 ml.) for three hours. Water was added, the layers separated and the benzene layer washed with water, dried and evaporated to dryness. The product (0.6 g.) was a pale yellow gum, $n_D^{22}$ 1.6370, $\nu$ max. 1030, 1240 cm.$^{-1}$.

EXAMPLE 7

This example illustrates the preparation of further compounds Nos. 25 to 29, 31 to 34 and 36 to 39 of Table 1. These compounds were prepared by a similar method to that recited in Example 1 above, using the appropriate starting substances (reactants) in each case. The analysis figures for compounds Nos. 27 and 32 are as follows.

Compound No. 27 of Table 1.—$C_{14}H_{15}NO_3S_2$ requires: S. 20.73. Found: S, 18.2%. $\nu$ max. 1050, 1280 cm.$^{-1}$.

Compound No. 32 of Table 1.—$C_{12}H_{14}O_2S_2$ requires: S, 25.21. Found: S, 23.4%. $\nu$ max. 1060, 1240 cm.$^{-1}$.

EXAMPLE 8

This example illustrates the preparation of the compound p-chloro-α-cyanobenzyl-dimethyl-dithiocarbamate (Compound No. 2 of Table 1) having the formula:

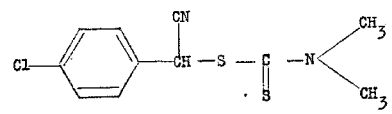

To a solution of α-bromo-p-chlorobenzylcyanide (5.76 g.; 0.025 mole) in anhydrous benzene (30 ml.) was added dimethylammonium dimethyldithiocarbamate (4.15 g.; 0.025 mole) and the mixture heated under reflux for one hour. After allowing the solution to cool to room temperature it was poured onto water, the benzene layer separated and then dried over $MgSO_4$. Removal of the benzene under reduced pressure gave an oil which readily solidified on scratching with a glass rod. The solid was crystallised from ethanol to afford the product as colourless needles (4.1 g.:60%), M.P. 108°. (Found (percent): C, 48.6; H, 4.13; N, 10.4; S, 23.3. $C_{11}H_{11}ClN_2S_2$ requires (percent): C, 48.8; H, 4.07; N, 10.35; S, 23.66).

EXAMPLE 9

This example illustrates the preparation of further compounds of the general formula:

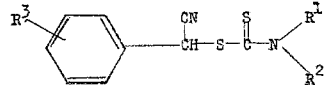

The compounds were prepared in analogous manner to that of Example 8 above using reactants of formula:

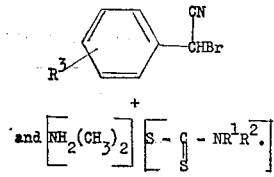

Details of the compounds produced are given in Table 1 where they are numbered 3 to 21.

EXAMPLE 10

This example illustrates an atomisable fluid comprising a mixture consisting of 25% by weight of compound No. 1 of Table 1 and 75% by weight of xylene.

EXAMPLE 11

This example illustrates a dusting powder which may be applied directly to plants or other surfaces and comprises 1% by weight of Compound No. 1 of Table 1 and 99% by weight of talc.

EXAMPLE 12

25 parts by weight of the product described in Example 1, 65 parts by weight of xylene, and 10 parts of an alkyl aryl polyether alcohol (Triton X-100; "Triton" is a trademark) were mixed in a suitable mixer. There was thus obtained an emulsion concentrate which can be mixed with water to produce an emulsion suitable for use in agricultural applications.

EXAMPLE 13

5 parts by weight of the product described in Example 1 were thoroughly mixed in a suitable mixer with 95 parts by weight of talc. There was thus obtained a dusting powder.

EXAMPLE 14

10 parts by weight of the product described in Example 1, 10 parts of an ethylene oxide-octylphenol condensate (Lissapol NX: "Lissapol" is a trademark) and 80 parts by weight of diacetone alcohol were thoroughly mixed. There was thus obtained a concentrate which, on mixing with water, gave an aqueous dispersion suitable for application as a spray in the control of insect pests.

EXAMPLE 15

This example ilustrates a concentrated liquid formulation in the form of an emulsion. The ingredients listed below were mixed together in the stated proportions and the whole stirred until the constituents were dispersed.

| | Percent wt. |
|---|---|
| Compound No. 4 (Table 1) | 20 |
| Lubrol L ("Lubrol" is a trademark) | 17 |
| Calcium dodecylbenzenesulphonate | 3 |
| Ethylene dichloride | 45 |
| Aromasol H ("Aromasol" is a trademark) | 15 |
| | 100 |

EXAMPLE 16

The ingredients listed below were ground together in the proportions stated to produce a powdered mixture readily dispersible in liquids.

| | Percent wt. |
|---|---|
| Compound No. 4 (Table 1) | 50 |
| Dispersol T ("Dispersol" is a trademark) | 5 |
| China clay | 45 |
| | 100 |

EXAMPLE 17

A composition in the form of grains readily dispersible in a liquid (for example water) was prepared by grinding together the first four of the ingredients listed below in the presence of water and then the sodium acetate was mixed in. The admixture was dried and passed through a British Standard mesh sieve, size 44–100 to obtain the desired size of grains.

| | Percent wt. |
|---|---|
| Compound No. 1 (Table 1) | 50 |
| Dispersol T | 12.5 |
| Calcium lignosulphonate | 5 |
| Sodium dodecylbenzenesulphonate | 12.5 |
| Sodium acetate | 20 |
| | 100 |

EXAMPLE 18

A composition suitable for use as a seed dressing was prepared by mixing all three of the ingredients set out below in the proportions stated.

| | Percent wt. |
|---|---|
| Compound No. 1 (Table 1) | 80 |
| Mineral oil | 2 |
| China clay | 18 |
| | 100 |

EXAMPLE 19

A granular composition was prepared by dissolving the active ingredient in a solvent, spraying the solution obtained onto the granules of pumice and allowing the solvent to evaporate.

| | Percent wt. |
|---|---|
| Compound No. 1 (Table 1) | 5 |
| Pumice granules | 95 |
| | 100 |

EXAMPLE 20

An aqueous dispersion formulation was prepared by mixing and grinding the ingredients recited below in the proportions stated.

| | Percent wt. |
|---|---|
| Compound No. 4 (Table 1) | 40 |
| Calcium lignosulphonate | 10 |
| Water | 50 |
| | 100 |

The following constitutes an explanation of the compositions or substances represented by the various trademarks and trade names referred to in the foregoing examples.

Lubrol L is a condensate of 1 mole of nonyl phenol with 13 molar proportions of ethylene oxide.

Aromasol H is a solvent mixture of alkylbenzenes.

Dispersol T is a mixture of sodium sulphate and a condensate of formaldehyde with the sodium salt of naphthalene sulphonic acid.

Lubrol APN 5 is a condensate of 1 mole of nonyl phenol with 5½ moles of naphthalene oxide.

Cellofas B 600 is a sodium carboxymethyl cellulose thickener.

Lissapol NX is a condensate of 1 mole of nonyl phenol with 8 moles of ethylene oxide.

The compound numbered 22 in Table 1 above (Example 1) was tested against the soil-borne diseases *Fusarium culmorum* and *Rhizoctonia solani*. The results of these tests are set out in Tables II and III below, respectively.

In the first test John Innes seeding compost was admixed with a culture of *Fusarium culmorum* grown on an admixture of soil and cornmeal and the entire mixture was then wrapped in brown paper and incubated in the glasshouse for 48 hours. The incubated soil was placed in pots; then seeds (twenty per pot) treated with China clay compositions containing the invention compound in concentrations of 500 and 1000 parts per million were sown in the pots. Seeds treated with "Agrosan" (trademark) mercury seed dressing were used as a standard. Counts of the seedlings emergent 10 days after sowing were taken and the results converted to a percentage of the seeds sown. Disease assessments were made 17 days after sowing; the results given in the table are the percentage of the emerged seedlings that are healthy.

In the second test an inoculum of *Rhizoctonia solani* was added to a partially sterilised loam soil, to provide the latter with a 1% w./w. content of the inoculum. The loam soil was then allowed to stand for one week so as to be completely colonised by the disease. The compound of Example No. 1 was then admixed with the loam soil at a rate of 50, 100 and 200 parts per million parts of soil (by weight). After standing for four days to allow the chemical to take effect plastic pots were half-filled with untreated, partially sterilised, loam soil and cotton seeds sown on the surface thereof, whereafter the pots were topped up with the treated loam soil. A control experiment was conducted with P.C.N.B. (pentachloronitrobenzene). The pots were then inspected an assessed five days later for emergence the results being converted to a percentage of the seeds sown. A disease assessment was made after a further five days; the results given in the table are the percentage of the emerged seedlings that are healthy.

TABLE II

| Chemical compound used to treat seed | P.p.m. active ingredient | Emergence, percent | Emerged plants healthy, percent |
|---|---|---|---|
| Compound of Example 1 | 500 | 49 | |
| Do | 1,000 | 54 | 53 |
| 'Agrosan' | ¹ 20 | 54 | 61 |

TABLE III

| Chemical compound used to treat seed | P.p.m. active ingredient | Emergence, percent | Emerged plants healthy, percent |
|---|---|---|---|
| Compound of Example 1 | 50 | 3.1 | |
| Do | 100 | 34.4 | 15 |
| Do | 200 | 59.4 | |
| P.C.N.B | 100 | 21.9 | 10 |

Other of the invention compounds were tested against these two diseases and also against the soil-borne disease *Pythium ultimum*. The test against the latter disease is conducted as follows:

Approximately one gram portions of a culture of *Pythium ultimum* maintained on 2% malt agar test-tube slopes at 20° C. are transferred to about 400 grams of sterilized soil containing 5% maize meal in a half pint bottle. After 10 to 14 days the inoculated soil is mixed with sterile John Innes seed compost at the rate of 2 bottles to 3½ buckets of 2 gallons capacity. The mixture is moistened and covered and after three days is used as follows. Approximately 100 grams of the mixture is placed into a fibre pot and 10 pea seeds coated 2 days beforehand with chemical under test at the rate of 500 p.p.m. are sprinkled on the surface of the soil. Another 100 grams of the mixed soil is then placed on top of the seeds and the pot is kept in the greenhouse at between 16° and 22° C. A first count of emergent seedlings is made after 10 days and another week is allowed to lapse before a second visual assessment takes places by pulling the seedlings up and inspecting their roots. Six replicates are conducted and observations are made of the number of healthy seedlings and the number of unhealthy seedlings. The number of ungerminated seeds is 10 less the number of emergent seedlings. Controls wherein untreated seed is used and also standards wherein seed treated with Fernasan and seeds treated with drazoxolon are used are simultaneously carried out. Calculations are then made whereby a grading is obtained for disease control.

In the table below the figures in the right hand column are the numbers of the compounds (see Table I) tested and the grading scale number is given beneath in parenthesis. The particular disease is represented in the left hand column and the concentration of the compound used is in brackets beneath the disease name. The grading scale is as follows:

| Grading: | Percentage amount of disease |
|---|---|
| 0 | 61–100 |
| 1 | 26–60 |
| 2 | 6–25 |
| 3 | 0–5 |

TABLE IV

| Disease | Compound No. and disease grading |
|---|---|
| *Pythium ultimum* (500 p.p.m.) | 26, 31. (1) (1) |
| *Fusarium culmorum* (1,000 p.p.m.) | 33, 32, 5, 35, 23, 38, 14, 29, (1) (1) (1) (1) (2) (1) (1) (3) |
| | 37, 13, 28, 15, 31, 27, 2, 16, (3) (1) (2) (1) (2) (2) (3) (1) |
| | 30, 24, 22, 36. (2) (3) (3) (3) |
| *Rhizoctonia solani* (100 p.p.m.) | 33, 1, 24, 23, 38, 12, 29, 37, (2) (1) (2) (2) (1) (1) (3) (3) |
| | 28, 31, 22, 36. (1) (1) (3) (3) |

Compositions according to the invention were made up and tested against various foliar borne fungal diseases, and the results of these are shown hereinafter. In these tests, details of which are given below under the headings A and B, the test plants were either sprayed so that the leaves were wetted, or the surrounding soil drenched with a solution or suspension containing the active compound and 0.1% of a wetting agent when specified.

(A) Spray-applied protectant test

A suspension or solution containing the active compound was sprayed directly onto the leaves of plants, a wetting agent being used when the plant was wheat, barley or rice. After a suitable period of time (time interval A) depending upon the particular plant, the plant was inoculated with the fungus under test and after a further suitable period of time (time interval B) again depending upon the particular plant and fungus, the extent of infection was assessed visually.

| Disease and plant | Time interval A | Time interval B | Concentration of compound in composition |
|---|---|---|---|
| *Podosphaera leucotricha* (apple) | 24 hours | 7 days | 500 |
| *Uncinula necator* (vine) | do | do | 500 |
| *Piricularia oryzae* (rice) | 5 hours | 6 days | 500 |
| *Phytophthora infestans* (tomato) | 3 days | 3 days | 500 |
| *Plasmopara viticola* (vine) | 5 hours | 11 days | 500 |
| *Puccinia recondita* (wheat) | do | 8 days | 500 |

(B) Drench-applied protectant test

A suspension or solution containing the active compound was applied to the soil surrounding the plant under test, and the plant was inoculated with the fungus and the extent of infection was assessed visually as described under test A above.

| Disease and plant | Time interval A, hours | Time interval B, days | Concentration of compound in composition |
|---|---|---|---|
| *Sphaerotheca fuliginea* (cucumber) | 72 | 8 | 500 |
| *Piricularia oryzae* (rice) | 72 | 5 | 500 |
| *Phytophthora infestans* (tomato) | 72 | 3 | 500 |

The activity of the compounds against the various fungal infections of plants was recorded in terms of a grading scale, the grading being determined by visual comparison of the percentage amount of disease on the treated plant with that of an infected, but untreated, control plant. The grading scale used was as follows:

| Percent amount of disease | Grading |
|---|---|
| 61–100 | 0 |
| 26–60 | 1 |
| 6–25 | 2 |
| 0–5 | 3 |

The results obtained with various plants and fungi are set out below in Tables V and VI corresponding to the results obtained in Tests A and B, respectively.

TABLE V

| Disease | Compound No. and disease grading |
|---|---|
| Wheat rust (*Puccinia recondita*) | 30, (2) 4, (1) 5, (1) 20, (1) |
| Tomato late blight (*Phytophthora infestans*) | 11, (2) 2, (1) 15, (2) 4, (1) 12, (1) 20, (2) |
| Apple powdery mildew (*Podosphaera leucotricha*) | 32, (2) 29, (2) 37, (2) 28, (2) 15, (1) 31, (2) 27, (1) 30, (2) |
| Vine downy mildew (*Plasmopara viticola*) | 12, (2) 15, (2) 16, (1) |
| Rice blast (*Piricularia oryzae*) | 7, (3) 6, (2) 34, (1) 12, (2) 38, (1) 10, (1) 9, (1) 29, (2) |
|  | 31, (2) 16, (2) 30, (3) |

TABLE VI

| Disease | Compound and disease grading |
|---|---|
| Cucumber powdery mildew (*Sphaerotheca fuliginea*) | 14. (1) |
| Tomato late blight (*Phytophthora infestans*) | 18, (1) 36, (1) 24, (3) 38, (1) 13, (1) 28, (2) |
| Rice blast (*Piricularia oryzae*) | 38, (1) 39, (2) 33, (1) 29, (2) 28, (1) 15. (1) |

The invention compounds are of considerably lower toxicity to mammals than the products known as Blasticidin and *Blasticidin S*. For example Compound Number 22 of Table 1 above has an $LD_{50}$ figure for oral administration to rats of greater than 1600 milligrams per kilogram (mg./kg.), whereas the comparable values for Blasticidin and *Blasticidin S*. are below 100 mg./kg. In addition the compounds of the present invention are less costly to produce than either Blasticidin, *Blasticidin S*. or other fermentation type fungicidal agents in general which are commercially important fungicides and which are particularly useful for control of disease *Piricularia oryzae* (rice blast) against which, for example, Compound No. 30 of Table 1 above, is particularly effective.

We claim:

1. A compound of the general formula:

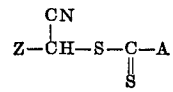

wherein

Z is chlorophenyl; and

A is alkoxy of up to 12 carbon atoms.

2. The compound according to claim 1 and having the formula:

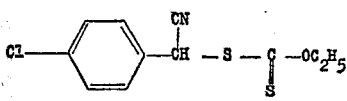

3. The compound according to claim 1 and having the formula:

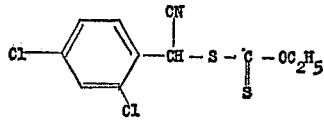

References Cited

UNITED STATES PATENTS

| 2,381,483 | 8/1945 | Blake et al. | 260—455 |
| 2,861,913 | 11/1958 | Wegler et al. | 424—301 |
| 3,150,119 | 9/1964 | Hoffenberg et al. | 260—455 |
| 3,331,865 | 7/1967 | Weil et al. | 260—455 |
| 3,485,925 | 12/1969 | Page | 424—304 |

FOREIGN PATENTS

| 18,200 | 11/1962 | Japan | 260—465 G |
| 13,968 | 6/1968 | Japan | 260—455 B |
| 1,211,853 | 12/1962 | Germany | 260—465 |

LEWIS GOTTS, Primary Examiner

G. HOLLRAH, Assistant Examiner

U.S. Cl. X.R.

260—247.1, 268 C, 293.4 H, 326.82, 455 A; 424—248, 250, 267, 274, 300, 301